United States Patent [19]
Fischer

[11] Patent Number: 5,193,289
[45] Date of Patent: Mar. 16, 1993

[54] APPARATUS FOR MEASURING THE THICKNESS OF THIN LAYERS

[76] Inventor: Helmut Fischer, Industriestrasse 21, 7032 Sindelfingen 6 - Maichingen, Fed. Rep. of Germany

[21] Appl. No.: 872,921

[22] Filed: Apr. 23, 1992

[30] Foreign Application Priority Data

Sep. 8, 1991 [DE] Fed. Rep. of Germany ....... 4129687

[51] Int. Cl.⁵ .............................................. G01B 5/12
[52] U.S. Cl. ...................................... 33/834; 33/542; 33/544
[58] Field of Search ............... 33/834, 832, 833, 542, 33/544, 544.2, 544.3; 324/230, 229, 231

[56] References Cited

U.S. PATENT DOCUMENTS 3,307,266 3/1967 Miserocchi ............................ 33/834

FOREIGN PATENT DOCUMENTS 0133301 8/1982 Japan ..................................... 33/542
0549737 12/1942 United Kingdom .................. 33/542

*Primary Examiner*—Harry N. Haroian

[57] ABSTRACT

A long arm bears a probe at its end and is arranged in such a way that it can swivel by small angular amounts. This low-mass and slowly movable system is protected by a protective device from which it emerges only partly during the measuring operation. A lowering device which both decouples and entrains, interacts with a damping element. An article to be measured is pushed onto the protective device, an actuating device is pressed and the probe slowly emerges from the protective device and ultimately rests in a defined manner and with adequately low force on a layer of the article.

63 Claims, 5 Drawing Sheets

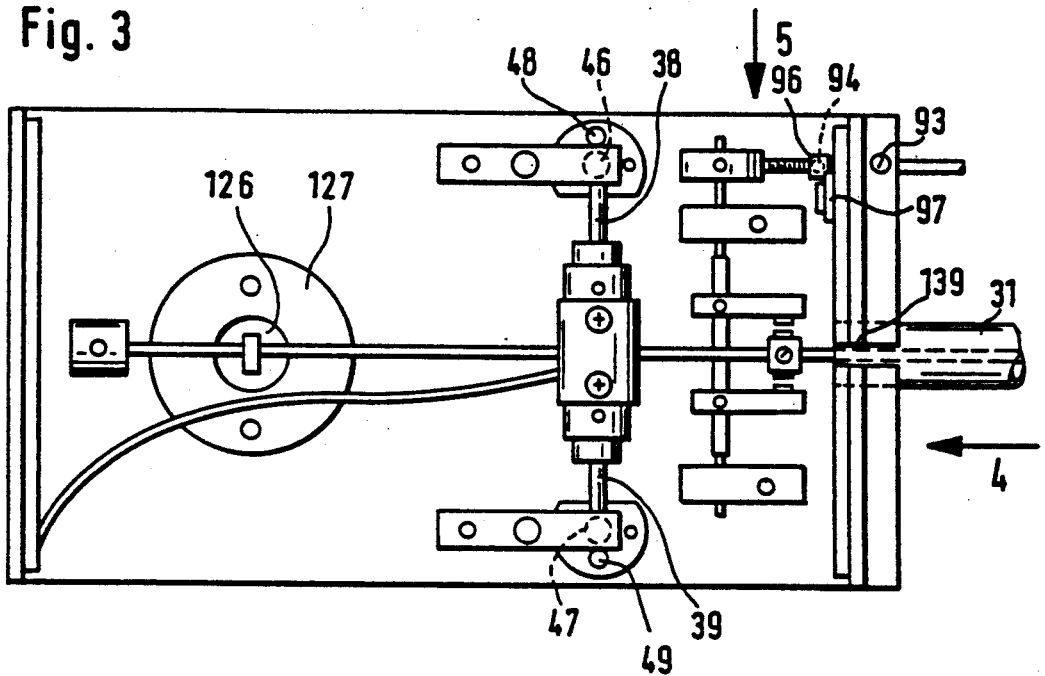
Fig. 3
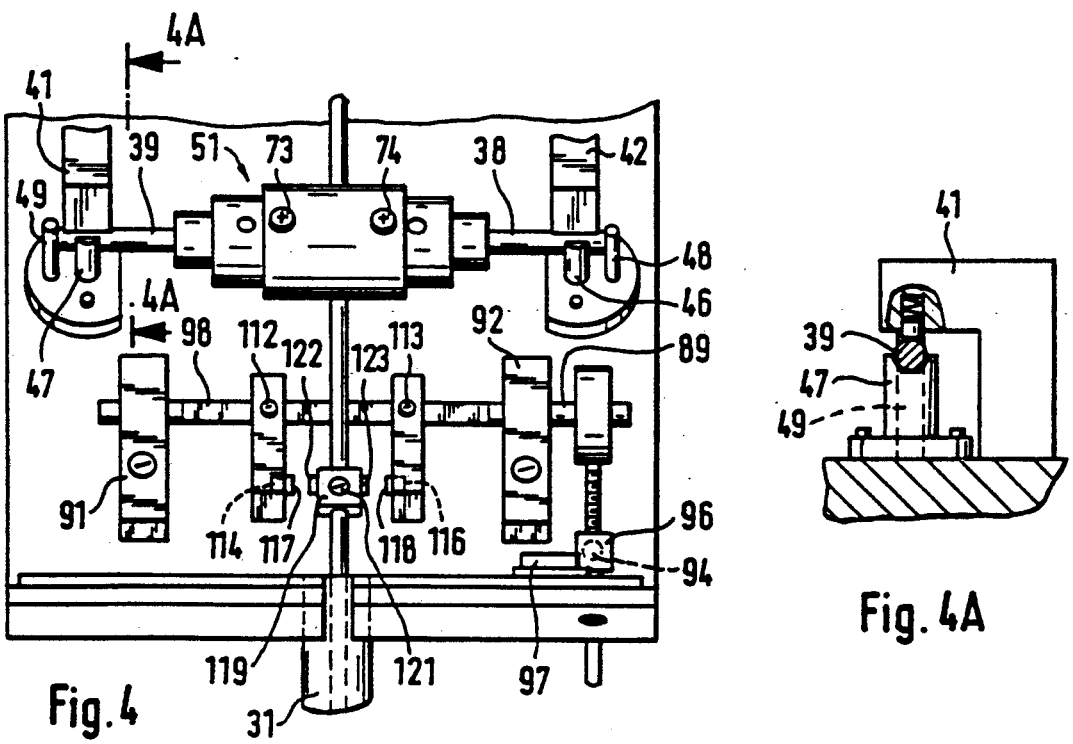
Fig. 4
Fig. 4A

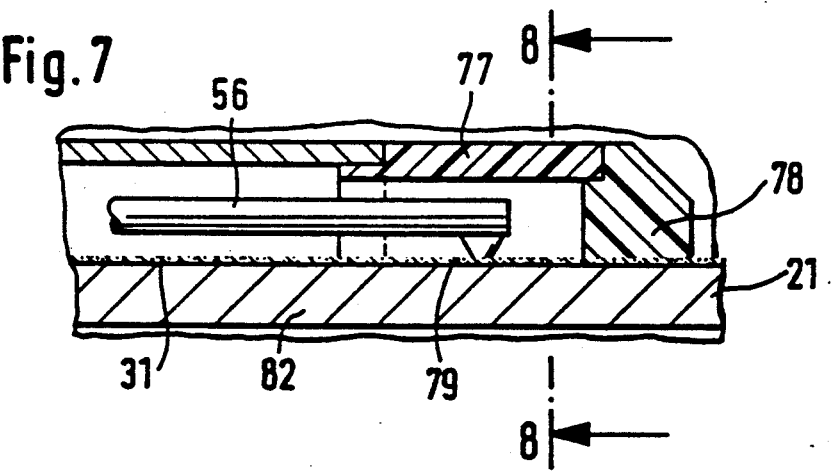
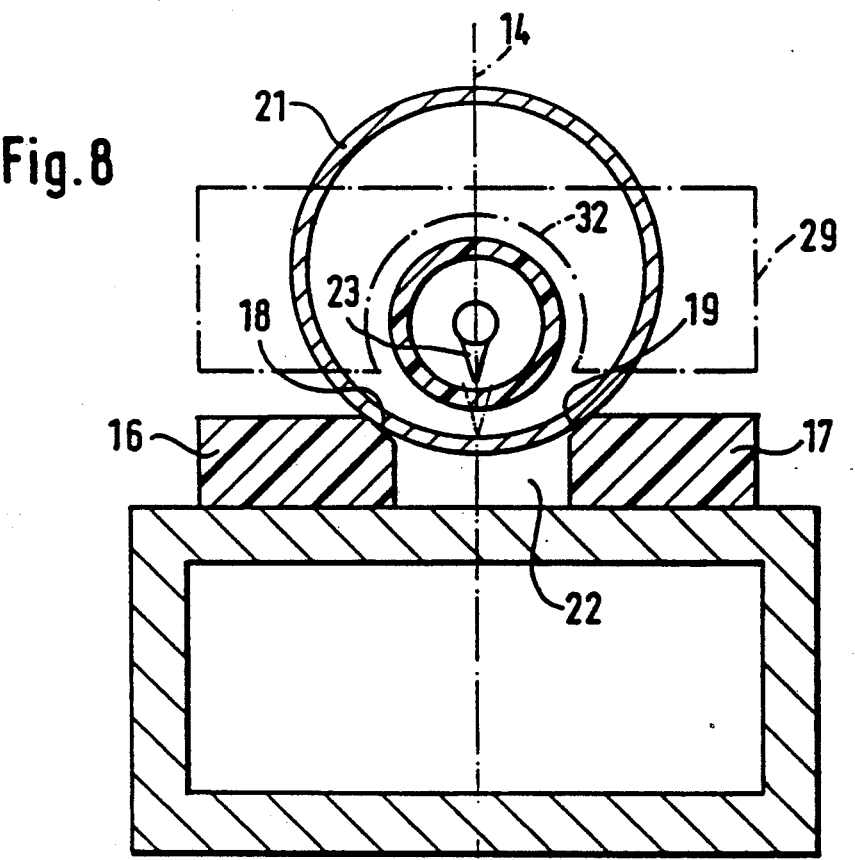

APPARATUS FOR MEASURING THE THICKNESS OF THIN LAYERS

BACKGROUND OF THE INVENTION

An apparatus for measuring the thickness of thin layers includes a probe, guide means for gently setting down said probe perpendicularly on a layer and an electric line connected to said probe. Such layer thicknesses typically lie between 2 and 10 micrometers, but may also reach 100 micrometers. Measuring inner layers of tubular articles, such as for example toothpaste tubes, paint tubes, hair-spray cans, preserved-food cans or the like, presents difficulties. All these consumer articles have in common that their wall has to be protected toward the inside by a layer. The wall on tubes is often aluminum, which is virtually pure aluminum. Sometimes, however, the wall is also of a ferrous metal. Sometimes, however, even the material itself produces protective layers, such as for example the oxide layer on light metals. It is known that the magnetic measuring principle is used if the base material is a ferrous metal. Otherwise, the magnetic principle may also be used. Sometimes, however, it is also required to measure wall thicknesses, such as for example aluminum wall thicknesses, without said walls having an insulating layer or a protective layer. In some cases, it is better to measure from inside to outside, instead of from outside to inside. The coating layers may also be layers which are intended to insulate electrically. The thin layers may, however, also be of quartz, bitumen or some other thin layer.

In particular in those articles which have a diameter in the lower cm range, until now it was scarcely possible to provide information on the thin layer on the inside. Added to this is the fact that, in the case of such thin layers, there is the risk that they may be influenced in their thickness by the application of the probe. This may vary from piercing the layer to crater-like depressions, as are known for example from hardness measurements. There it is in actual fact necessary to press a test piece into the layer, whereas in fact this is to be avoided here.

OBJECT AND STATEMENT OF THE INVENTION

The object of the invention is to eliminate, at least partially, the disadvantages specified above.

According to the invention, this object is achieved by the following features: The apparatus has a flexurally rigid base and fastening means fixedly connected to said base. Said fastening means bear a long protective means having an inside with a protective space. Resting means are situated between said protective means and said base, and intermediate space is provided between said protective means and said resting means. A balance beam having at least a first arm runs at least partially in said protective means and bears said probe. Said balance beam bearing bears said first arm. Lowering means are operably connected to said balance beam for slowly lowering said probe out of said protective space, and damping means are operably connected to said balance beam for damping movement of said balance beam. In the case of a prototype of the invention, a repeat accuracy of 0.1 micrometer has been successfully achieved. To do so, the operator merely has to bring the tubes or such like articles with the wall region to be measured between theprotective device and the resting device, operate the lowering device either mechanically or manually and all that is necessary is to remove the article being measured once the probe has reached its position of rest.

Additionally, a preferred embodiment of invention includes the following advantageous features:

The base is made of a metal containing at least a little iron.

The base is made of a light metal alloy.

The base is an extruded rectangular metal tube having an oblong plane on its upper side.

The fastening means is at least partly a rigid wall fixedly connected to said base.

The protective means is held in said fastening means over a relatively long distance without backlash.

The protective means is held removably in said fastening means.

The wall holds said protective means, and said wall is at least partly as thick as the protective means holding length.

The protective means is releasably secured in said fastening means.

The protective means can be drawn out of said fastening means in the direction of said probe.

The fastening means has a slit through which said arm can pass, at least with said protective means removed.

The protective means has a hollow profile.

The hollow profile is a channel, such as a circular round tube.

The protective means protrudes beyond said first arm.

The protective means has an opening that can be at least partly passed through by said probe.

Only one opening is provided for passage of said probe.

The protective means is at least predominantly made of a non ferrous metal, such as brass.

The protective means is at least predominantly made of a light metal.

The protective means is in the region of said probe, at least predominantly made of an electrically nonconductive material and has an opening in said nonconductive material for passage of said probe.

The material is plastic.

The protective means has an end region having at least partly a contrasting color.

The balance beam has a second arm, and said first arm is longer than said second arm.

The balance beam includes said first and second arm in one piece.

The first arm is at least partly hollow and bears said electric line for said probe.

The first arm is a capillary tube.

The first arm is at least predominantly made of an electrically nonconductive material.

The first arm is at least predominantly made of brass.

The first arm is at least predominantly made of a light metal.

The first arm is longer than 10 cm.

The first arm is 25 cm±10 cm. long.

The electric line connects with said balance beam in the region of said balance beam bearing.

The balance beam bearing is fixedly connected to said balance beam.

The balance beam bearing has two bearing points that are perpendicular with respect to said balance beam and are spaced approximately the width of said base.

The balance beam bearing has at least two clamping portions for clamping said balance beam.

In the middle of said balance beam bearing, a hole is provided in said first arm through which hole said electric line enters said first arm.

The lowering means lowers said probe in the range of 5 to 0.5 degrees of angle.

The lowering means lowers said probe in the range of 1, +2, −0.5 degrees of angle.

A force generating means acts on said balance beam at least for lowering said balance beam.

The force generating means uses magnetic gravitational force of permanent magnets.

A force generating means acts on said balance beam at least essentially symmetrically with respect to said balance beam.

At least a first magnet and a counterpart can move in the range of attraction of said first magnet relative to each other, essentially parallel with respect to swivelling movement of said balance beam, one of said magnet and said counterpart being fastened to said balance beam.

The counterpart is a second magnet that is polarized in the direction of attraction.

A fork can move up and down and has prongs that are movable at least essentially parallel with respect to swivelling movement of said balance beam, wherein two magnets are provided on said balance beam and said fork.

The counterpart is within a predetermined range of distance from said magnet.

The distance is 1 to 15 mm.

The distance is 4 mm+60%−40%.

The magnets are ferrite magnets.

The prongs are seated on an axle that can swivel arbitrarily by an angular amount that is greater than the lowering swivelling movement of said balance beam but never allows the force required for setting said probe down on said layer to become uncontrolled.

The axle is connected to a manually operable actuating lever, and a first stop prevents movement of said prongs at least in the lowering direction of said first arm to cause loss of control of said force.

A second stop determines how far said first arm can be raised.

The axle is situated underneath said balance beam.

The lowering means acts on said first arm.

The damping means is a pneumatic damping element.

The pneumatic damping element is a piston and cylinder.

The pneumatic damping element is of the airpot type of Messrs Airpot Corp., Norwalk, Conn.

The pneumatic damping element is of the airpot 56 type.

The balance beam comprises said first arm and a second arm, and said damping means acts on said second arm.

A counterweight is fastened to said second arm.

DESCRIPTION OF THE DRAWINGS

The invention is now described with reference to a preferred embodiment. In the drawings:

FIG. 3 shows the plan view of the left-hand region, FIG. 4 shows a three-dimensional view according to the arrow 4 in FIG. 3, seen from the top right, FIG. 4a shows a section along the line of 4a in FIG. 4, FIG. 7 shows a broken-off section according to the arrows 7—7 in FIG. 1, but without the base and positioning device, FIG. 8 shows a section along the line 8—8 in FIG. 7, but with base and positioning device.

DETAILED DESCRIPTION

Figure 1:
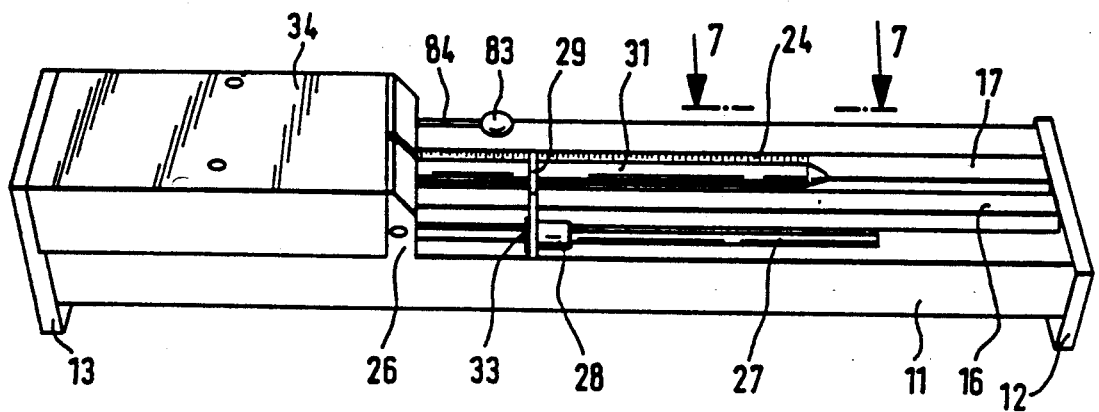
FIG. 1 shows a three-dimensional plan view of the overall apparatus according to the invention, having a cover for its left-hand region.

According to FIG. 1, a base 11 is provided at the right-hand end with a barely upward-protruding rectangular end piece 12, on which it is supported there, and on the left with a likewise rectangular, but much further upward-protruding end piece 13, on which the base 11 is supported there. The base 11 comprises a flat, horizontally lying, rigid, extruded aluminum tube, as can be seen for example from FIG. 8. Both the base 11 and the end pieces 12, 13 are of an aluminum alloy. Two prisms 16, 17, which are of plastic, have quite a flat-shaped cross section and in each case have a mutually facing bearing bevel 18, 19, are provided on the base 11, symmetrically with respect to its geometrical center plane 14. Depending on the diameter of the tube 21, these prisms 16, 17 are moved away from the center plane 14 or toward it, means which are not shown always enforcing parallelism with respect to the center plane 14 and symmetry with respect thereto. If the diameter of the tube 21 is small, the prisms 16, 17 are closer to each other than if the diameter is greater. Between them they define an air gap 22, so that the tube 21 never rests on the base 11 and a probe 23 on the far side of the tube 21 sees only air. A centimeter scale 24 is provided on the prism 17. A solid aluminum wall 26 stands to the left of the prisms 16, 17, according to FIG. 1, is very rigid and is also rigidly connected to the base 11 on its underside. It is as wide as the base 11 and further stiffens the latter. According to FIG. 1, fastened at the front on the aluminum wall 26 is a steel rod 27, fixedly restrained on the left, which is located parallel to the center plane 14 approximately on a level with the prism 16. It is somewhat longer than the scale 24 and also protrudes further to the right than the latter. On the steel rod 27, a sleeve 28 can be pushed to the left or right. Fastened to the sleeve 28 is a stop rule 29, which extends perpendicularly with respect to the center plane 14, bridges a brass tube 31, reaches as far as the scale 24 and has a recess 32 which is downwardly open at the edge and is for the brass tube 31. This recess 32 never touches the tube 31. A leaf spring 33, which at the bottom is firmly screwed to the front region of the stop rule 29, has a recess which is slightly greater than the diameter of the circular-cylindrical steel rod 27 and according to FIG. 1 has a prestress to the left, serves as a displacement preventor. The leaf spring 33 clamps itself, and consequently also the stop rule 29, firmly in place without neutralizing the prestress on the steel rod 27, because its through-hole is only slightly larger than the diameter of the steel rod 27. If the leaf spring 33 is taken between the thumb and index finger and pushed toward the right to the region there of the stop rule 29, its through-hole is again perpendicular with respect to the steel rod 27 and the leaf spring 33, and consequently also the stop rule 29, can be slid to the left and right on the steel rod 27. If, in the position drawn, the tube 21 butts against the stop rule 29, the probe 23 is at a distance from there of 17.5 cm, that is to say that the depth at which measurement is being carried out in the tube 21 can be seen from the outside.

A cross-sectionally U-shaped cover 34 is held at its edges on the left, according to FIG. 1, by the upper region of the end piece 13 and on the right by the aluminum wall 26. If it is removed, arrangements according to FIGS. 2 to 6 are found. A geometrical longitudinal axis 36 extends perpendicularly with respect to the center plane 14. Also corresponding to the latter is an actual axle 37, not continuous in the middle, the ends of which are two aligned axle journals 38, 39, which are ground circular-cylindrically and are mounted on supports 41, 42, which are firmly screwed to the base 11 and stand upright. At the upper end, the supports 41, 42, consisting of brass, have a prismatic recess, which receive the end regions of the axle journals 38, 39 without backlash, since the prism faces are planes which open upwardly in the form of a V. In relation to the width of the base 11, these supports 41, 42, and consequently also the bearing points, lie far apart. Counter supports 43, 44, L-shaped in side view, are fixedly connected to the base 11 by their vertical web, in the lower region of the latter. They are parallel with respect to the center plane 14. They are flexurally extremely rigid in the upward direction. In their horizontal legs, they have a downwardly open blind bore 46, 47. Fitted in the latter is a compression spring, which can bear against the end of the blind bore and presses a thrust piece downward onto the end regions of the axle journals 38, 39, the downwardly directed end face of which is planar. Thus, a highly accurate, backlash-free mounting with respect to the geometrical longitudinal axis 36 is obtained.

Figure 6:
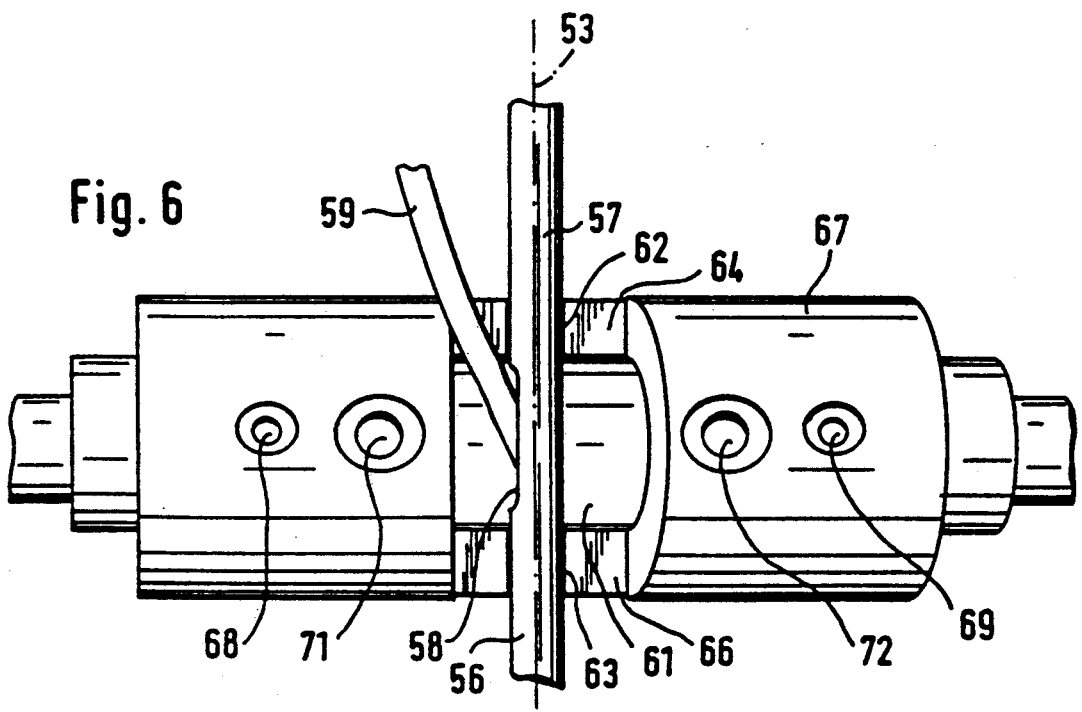
FIG. 6 shows an enlarged representation from the central region from FIG. 4 in plan view.
Figure 9:
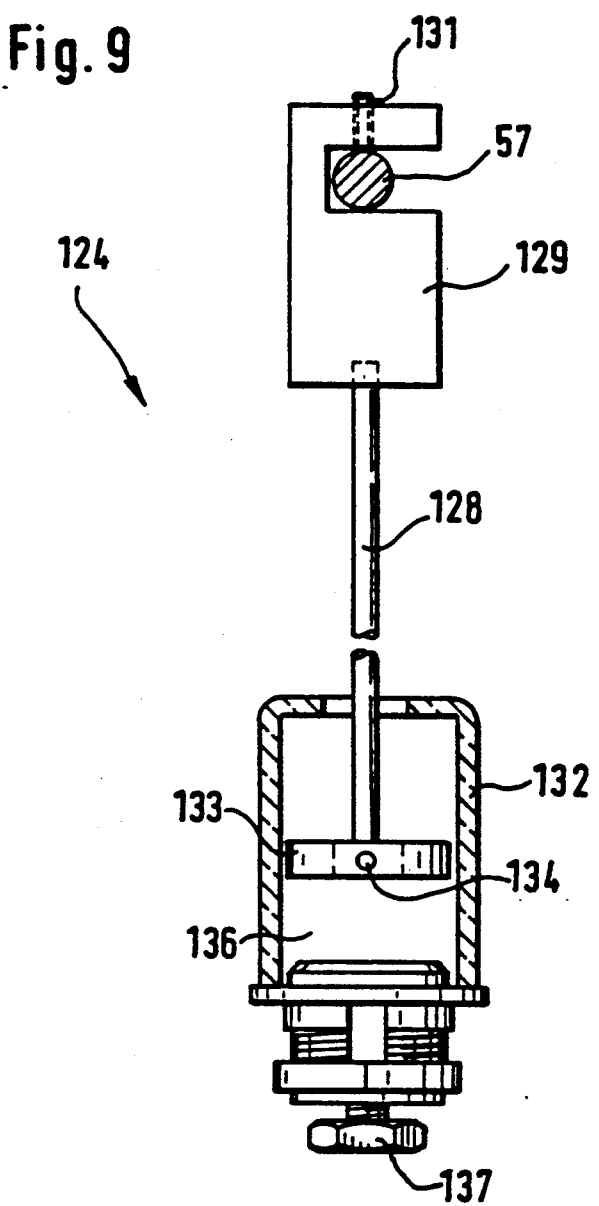
FIG. 9 shows the broken-off cross section through a damping element, as is used in FIG. 3 in the left-hand region.

In order that this mounting does not have to absorb any forces perpendicularly to the geometrical longitudinal axis 36, on the outside upright posts 48, 49 of steel are provided, which rise up to the level of the geometrical longitudinal axis 36, are only a slight backlash distance away from the ends of the axle journals 38, 39 and thus prevent the axle journals 38, 39 and the parts connected to them being able to move too far to the left or right from the geometrical center plane 14. Connected to the axle journals 38, 39 is a clamping element 51, which clamps a balance beam 52, to be precise in such a way that the geometrical center axis 53 of the balance beam 52 lies in the center plane 14 and passes through the geometrical longitudinal axis 36. In the case of the illustrative embodiment, the balance beam 52 can be swivelled by 1°15′. The balance beam 52 comprises a continuous brass capillary tube having an outside diameter of 3 mm. The longitudinal axis divides the balance beam 52 into a long arm 56 and a short arm 57. According to FIG. 6, a small longitudinal recess 58 is provided in the region of a hollow space in the clamping element 51 in the balance beam 52 at the side, from below in the view of FIG. 3, through which longitudinal recess a shielded measuring line 59 is introduced into the arm 56. In the region of the coaxial hollow space 61, the balance beam 52 is not guided. Rather, this takes place in two half-round recesses 62, 63 which, according to FIG. 6, are downwardly directed and upwardly open at the edge, and grip precisely half way around the circular-cylindrical capillary tube from below. The hollow space 61, the recesses 62, 63 and essentially horizontally running steps 64, 66 are machined into the cylinder-shaped basic body 67. Furthermore, grub threads 68, 69, into which grub screws are screwed and thus connect the basic body 67 fixedly to the axle journals 38, 39. Furthermore, the basic body has threaded blind bores 71, 72. With screws 73, 74, a clamping plate 76 can be screwed from above onto the basic body 67, said clamping plate having an approximately half-round shape and pressing the balance beam 52 from above into the half shell-shaped recesses 62, 63, but without destroying the brass capillary tube. In addition, this design compensates for that loss in stiffness which has occurred due to the longitudinal recess 58 on the capillary tube. The arms 56, 57 consequently do not notice that they have been weakened in the region of their swivel axis.

At its end, the arm 56 bears the probe 23 and the miniature coils of the latter are connected in a way not shown to the measuring line 59. The brass tube 31 is connected in its free end region to a black plastic sleeve 77, which is not normally removable, and the latter is in turn closed toward the right, in FIG. 7, by a red stopper 78, which is likewise of plastic. Consequently, there is nothing in the region of the probe 23 which could falsify its measuring result. In FIG. 7, the arm 56 is drawn in its position of rest. In order that it can come out downward, the plastic sleeve 77 has on the right and left, symmetrically with respect to the center plane 14, a small hole 79, so that with arm 56 lowered the probe can rest in a defined manner on a coating layer 81 of the aluminum wall 82. In FIG. 7, both the thickness of the coating layer 81, and of the aluminum wall 82 are shown extremely exaggerated and FIG. 8 also has been exaggerated in this direction.

Figure 2:
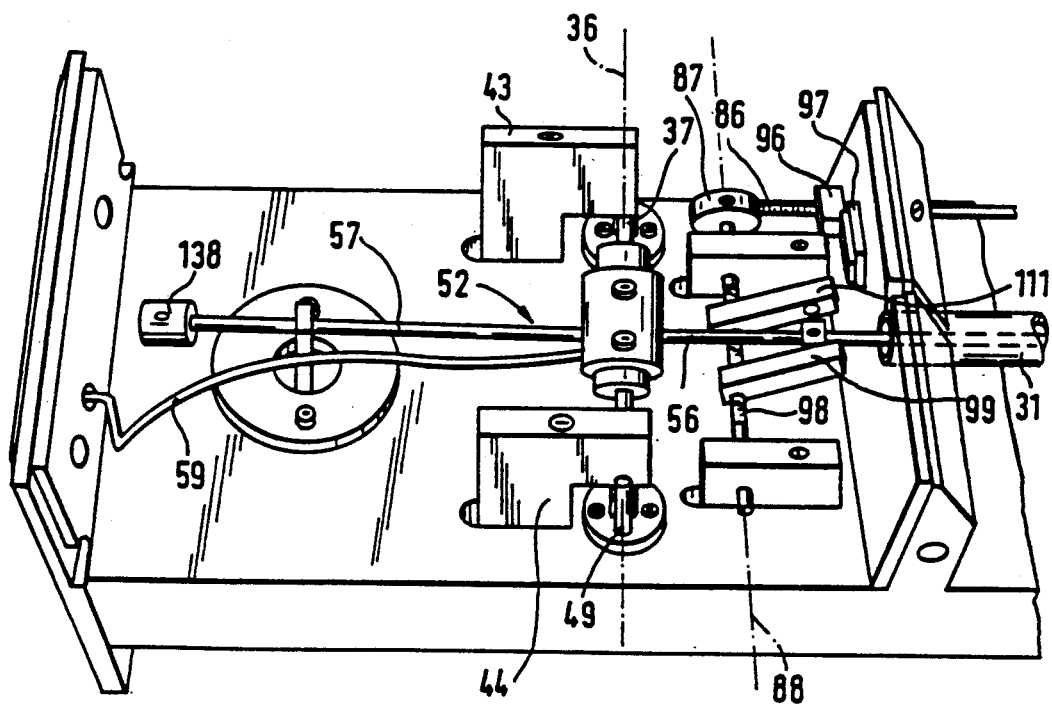
FIG. 2 shows the left-hand region on an enlarged scale without cover.
Figure 5:
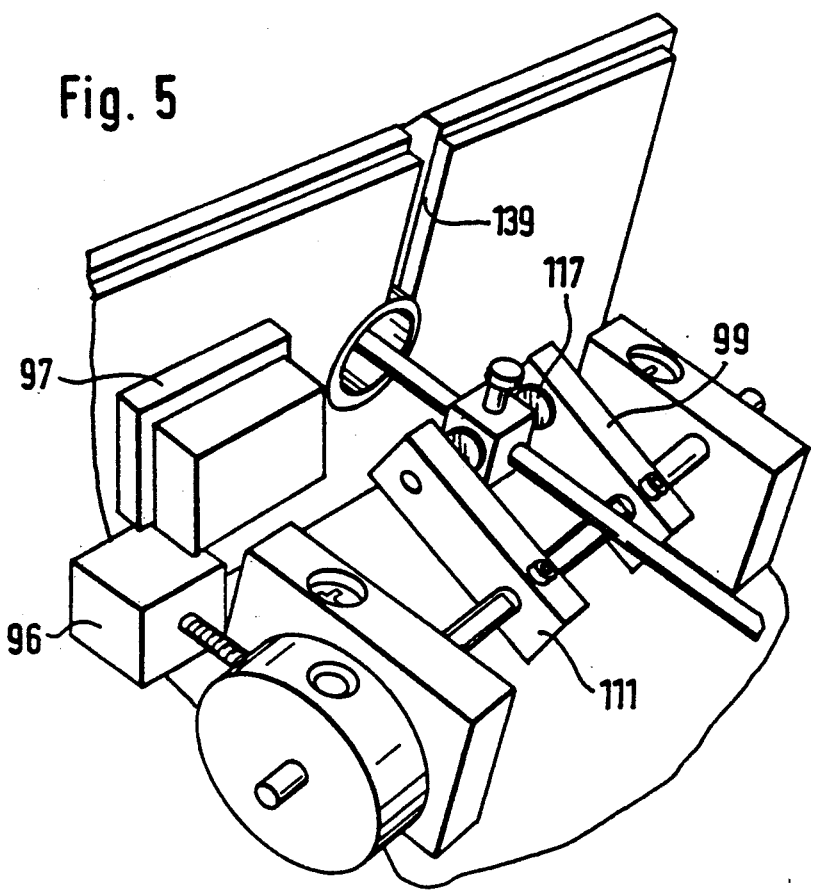
FIG. 5 shows a three-dimensional view according to the arrow 5 in FIG. 3, with the right-hand region from FIG. 3.

If the balance beam 52 swivels clockwise, according to FIG. 2, the tip of the probe 23 impinges on the surface of the coating layer 81 and is pressed there against it by a small force, the arm 56 bending slightly and no longer running coaxially with respect to the center axis 53 over the entire length.

A button 83 is provided for the lowering operation, which button has its lowermost limitation when it butts against the upperside of the base 11. Normally, however, it is in its upper position. It is guided by means of a steel lever 84 through the aluminum wall 26 in a correspondingly large clearance. The steel lever 84 is screwed with its outer thread 86 into a steel disc 87, which can swivel by about 15° about a geometrical longitudinal axis 88. The steel disc 87 is screwed fixedly onto a transverse axle 89, the swivel axis of which is the geometrical longitudinal axis 88 and is perpendicular with respect to the center plane 14. The transverse axle 89 runs underneath the arm 56, to be precise so far underneath it that the two never touch. In its two end regions, the transverse axle 89 is mounted by two bearing blocks 91, 92, which have transverse bores perpendicular with respect to the center plane 14 and are fixedly connected to the base 11. In the state of rest, the transverse axle 89 has the position drawn in solid lines in the figures. This is determined by a stop screw 93, which is screwed vertically from above into the rear region, according to FIG. 1, of the aluminum wall 26. The further the stop screw 93 is screwed out upward, the further the steel lever 84 can be swivelled upward. A helical compression spring 94, which at the bottom bears against the base 11 and at the top presses against a widening 96, which is firmly screwed to the steel lever 84 just behind the aluminum wall 26, ensures that said steel lever stays up. This widening 96 also controls an electric switch 97, which is screwed onto the aluminum wall 26 on the inside. If the steel lever 84 is up, the switch 97 prevents a measurement.

Between the bearing blocks 91, 92, the otherwise circular-cylindrical transverse axle 89 has a bevel, which in the view of FIG. 2 is directed approximately toward 10.30 hours. In this region and symmetrically with respect to the center plane 14, two fork prongs 99, 111 are provided, which are of non-ferrous metal, such as brass, represent oblong blocks, are congruent in side view, with each other point approximately toward 14.30 hours, are of equal length and are essentially parallel to the center plane 14. By means of grub screws 112, 113, which press on the bevel 98, they are angularly uniform with respect to the position of the transverse axle 89 and also fixed thereto. In the mutually facing end regions, the fork prongs 99, 111 have fitting bores 114, 116, which are congruent in side view and in which circular-cylindrical permanent magnets 117, 118 are seated, the field of which magnets is perpendicular with respect to the center plane 14 where it emerges from the planar end faces, which are perpendicular with respect to the center plane 14. Pushed onto the arm 56 in the region between the permanent magnets 117, 118 is a block 119, which has a suitable through-bore for the arm 56 and is fixed on the latter by a fixing screw 121. Recessed into its outer faces, parallel with respect to the center plane 14, are two permanent magnets 122, 123, which are the same size as the permanent magnets 117, 118, which have a field emergence area parallel with respect to the center plane 14 and in each case have an air gap of 4 mm. The polarization is in this case such that 117 and 122 attract each other and 118 and 123 attract each other. As a result, a force coupling is achieved. If the button 83 is pressed downward, the permanent magnets 117, 118 are lowered and 122, 123 follow them down. The same applies congruously. Thus, here the button 83 has been decoupled in terms of force from the probe 23, but an adequate, although not excessive, force is applied at the end of the lowering operation in order for the tip of the probe 23 to rest on the latter, on the one hand sufficiently quickly but on the other hand without damaging the coating layer 81. The apparatus does not deflect the balance beam 52 out of the center plane 14, but merely enforces an upward and downward movement in the plane 14 sufficiently gently. The smaller the air gap, the greater the forces of attraction (to the power of 2 of the spacing), so that the force with which the tip of the probe 23 rests can be determined by the spacing of the permanent magnets 122, 117 and 123, 118. In order not to twist the arm 56, the permanent magnets involved should be equally strong.

In order that the probe 23 sets down sufficiently slowly and gently (the kinetic energy is $= m/2 \cdot v^2$), a damping element 124, damping the movement, is provided. The center plane 14 also passes through the center plane of said damping element. It is accommodated in the left-hand region of the base 11, which has a bore 126 there and a holding ring 127, firmly screwed there, holds the damping element 124 in a way not shown. The plunger rod 128 of the latter is firmly connected to a hook element 129, in the hook opening of which a cross section of the arm 57 lies. In order to prevent relative movements between hook element 129 and arm 57, a grub screw 131, screwed in from above is provided. The damping element 124 comprises a cylinder 132 of glass, the upper head of which has a hole, so that the plunger rod 128 can cross through the latter. At the bottom, the plunger rod 128 has a plunger 133, which consists of graphite-treated pulverized coal and, by virtue of a joint 134, also does not twist. If the button 83 is pressed, the plunger 133 is urged upward, the space 136 is urged to enlarge and how quickly air can flow after into it is determined by a nozzle screw 137.

For weight balancing, a counter weight 138 is firmly screwed on one end of the arm 57.

The invention is capable of numerous variations. For example, the balance beam 52 could also be of titanium, which would further reduce the mass of the system. All provisions which on the one hand reduce the mass of the system, but on the other hand leave the rigidity of the moved masses within the necessary limits, are welcome. Furthermore, all measures which reduce the speed of the probe 23, in particular when setting down, are welcome. Thus, progressive damping elements, which specifically at the end of the movement dampen most, could also be used here.

I claim:

1. Apparatus for measuring the thickness of thin layers comprising:
   a probe,
   guide means for gently setting down said probe perpendicularly on a layer,
   an electric line connected to said probe,
   a flexurally rigid base,
   fastening means fixedly connected to said base,
   said fastening means bearing a long protective means having an inside with a protective space,
   resting means between said protective means and said base, an intermediate space being provided between said protective means and said resting means,
   a balance beam having at least a first arm that runs at least partially in said protective means and bears said probe,
   a balance beam bearing that bears said first arm,
   lowering means operably connected to said balance beam for slowly lowering said probe out of said protective space, and
   damping means operably connected to said balance beam for damping movement of said balance beam.

2. The apparatus as claimed in claim 1, wherein said base comprises a metal containing at least a little iron.

3. The apparatus as claimed in claim 1, wherein said base comprises a light metal alloy.

4. The apparatus as claimed in claim 1, wherein said base is an extruded metal tube having an oblong plane on its upper side.

5. The apparatus as claimed in claim 4, wherein said metal tube is a rectangular tube.

6. The apparatus as claimed in claim 1, wherein said fastening means is at least partly a rigid wall fixedly connected to said base.

7. The apparatus as claimed in claim 1, wherein said protective means is held in said fastening means over a relatively long extent without backlash.

8. The apparatus as claimed in claim 1, wherein said protective means is held removably in said fastening means.

9. The apparatus as claimed in claim 6, wherein said wall holds said protective means and said wall is at least partly as thick as the protective means holding length.

10. The apparatus as claimed in claim 1, wherein said protective means is releasably secured in said fastening means.

11. The apparatus as claimed in claim 1, wherein said protective means can be drawn out of said fastening means in the direction of said probe.

12. The apparatus as claimed in claim 1, wherein said fastening means has a slit through which said arm can pass, at least with said protective means removed.

13. The apparatus as claimed in claim 1, wherein said protective means has a hollow profile.

14. The apparatus as claimed in claim 13, wherein said hollow profile is a channel.

15. The apparatus as claimed in claim 13, wherein said hollow profile is a tube.

16. The apparatus as claimed in claim 13, wherein said hollow profile is a round tube.

17. The apparatus as claimed in claim 16, wherein said hollow profile is a circular round tube.

18. The apparatus as claimed in claim 1, wherein said protective means protrudes beyond said first arm.

19. The apparatus as claimed in claim 1, wherein said protective means has an opening that can be at least partly crossed through by said probe.

20. The apparatus as claimed in claim 19, wherein only one opening is provided for passage of said probe.

21. The apparatus as claimed in claim 1, wherein said protective means is comprised at least predominantly of a non ferrous metal.

22. The apparatus as claimed in claim 21, wherein said protective means is comprised at least predominantly of brass.

23. The apparatus as claimed in claim 21, wherein said protective means is comprised at least predominantly of a light metal.

24. The apparatus as claimed in claim 1, wherein said protective means is comprised in the region of said probe, at least predominantly of an electrically nonconductive material and has an opening in said nonconductive material for passage of said probe.

25. The apparatus as claimed in claim 24, wherein said material is plastic.

26. The apparatus as claimed in claim 1, wherein said protective means has an end region having at least partly a contrasting color.

27. The apparatus as claimed in claim 1, wherein said balance beam comprises a second arm, and said first arm is longer than said second arm.

28. The apparatus as claimed in claim 1, wherein said balance beams comprises said first arm and a second arm in one piece.

29. The apparatus as claimed in claim 1, wherein said first arm is at least partly hollow and bears said electric line for said probe.

30. The apparatus as claimed in claim 1, wherein said first arm is a capillary tube.

31. The apparatus as claimed in claim 1, wherein said first arm is comprised at least predominantly of an electrically nonconductive material.

32. The apparatus as claimed in claim 31, wherein said first arm is comprised at least predominantly of brass.

33. The apparatus as claimed in claim 31, wherein said first arm is comprised at least predominantly of a light metal.

34. The apparatus as claimed in claim 1, wherein said first arm is longer than 10 cm.

35. The apparatus as claimed in claim 1, wherein said first arm is 25 cm.±10 cm. long.

36. The apparatus as claimed in claim 1, wherein said electric line connects with said balance beam in the region of said balance beam bearing.

37. The apparatus as claimed in claim 1, wherein said balance beam bearing is fixedly connected to said balance beam.

38. The apparatus as claimed in claim 1, wherein said balance beam bearing has two bearing points that are perpendicular with respect to said balance beam and are spaced approximately the width of said base.

39. The apparatus as claimed in claim 1, wherein said balance beam bearing has at least two clamping portions for clamping said balance beam.

40. The apparatus as claimed in claim 1, wherein in the middle of said balance beam bearing, a hole is provided in said first arm through which hole said electric line enters said first arm.

41. The apparatus as claimed in claim 1, wherein said lowering means lowers said probe in the range of 5 to 0.5 degrees of angle.

42. The apparatus as claimed in claim 41, wherein said lowering means lowers said probe in the range of 1°, +2°, −0.5 degrees of angle.

43. The apparatus as claimed in claim 1, comprising a force generating means acting on said balance beam at least for lowering said balance beam.

44. The apparatus as claimed in claim 43, wherein said force generating means uses magnetic force.

45. The apparatus as claimed in claim 44, wherein said magnetic force is the force of permanent magnets.

46. The apparatus as claimed in claim 45, wherein said magnetic force is the magnetic gravitational force of permanent magnets.

47. The apparatus as claimed in claim 1, comprising a force generating means that acts on said balance beam at least essentially symmetrically with respect to said balance beam.

48. The apparatus as claimed in claim 46, wherein at least a first magnet and a counterpart can move in the range of attraction of said first magnet relative to each other essentially parallel with respect to swivelling movement of said balance beam, one of said magnet and said counterpart being fastened to said balance beam.

49. The apparatus as claimed in claim 48, wherein said counterpart is a second magnet that is polarized in the direction of attraction.

50. The apparatus as claimed in claim 48, further comprising a fork that can move up and down and having prongs that are movable at least essentially parallel with respect to swivelling movement of said balance beam, wherein two magnets are provided on said balance beam and said fork.

51. The apparatus as claimed in claim 48, wherein said counterpart is within a predetermined range of distance from said magnet.

52. The apparatus according to claim 51, wherein said distance is 1 to 15 mm.

53. The apparatus as claimed in claim 52, wherein said distance is 4 mm+60% 40%.

54. The apparatus as claimed in claim 45, wherein said magnets are ferrite magnets.

55. The apparatus as claimed in claim 50, wherein said prongs are seated on an axle that can swivel arbitrarily by an angular amount that is greater than the lowering swivelling movement of said balance beam but never allows the force required for setting said probe down on said layer to break away.

56. The apparatus as claimed in claim 55, wherein said axle is connected to a manually operable actuating lever, and a first stop prevents movement of said prongs at least in the lowering direction of said first arm beyond the breaking away of said force.

57. The apparatus as claimed in claim 55, wherein a second stop determines the maximum raising of said first arm.

58. The apparatus as claimed in claim 55, wherein said axle is situated underneath said balance beam.

59. The apparatus as claimed in claim 1, wherein said lowering means acts on said first arm.

60. The apparatus as claimed in claim 1, wherein said damping means comprises a pneumatic damping element.

61. The apparatus as claimed in claim 60, wherein said pneumatic damping element comprises a piston and cylinder.

62. The apparatus as claimed in claim 1, wherein said balance beam comprises said first arm and a second arm, and said damping means acts on said second arm.

63. The apparatus as claimed in claim 1, wherein said balance beam comprises said first arm and a second arm, and a counterweight is fastened to said second arm.

* * * * *